United States Patent
Yamazaki

(10) Patent No.: US 7,877,578 B2
(45) Date of Patent: Jan. 25, 2011

(54) PROCESSING APPARATUS FOR STORING BRANCH HISTORY INFORMATION IN PREDECODE INSTRUCTION CACHE

(75) Inventor: Yasuhiro Yamazaki, Kahoku (JP)

(73) Assignee: Fujitsu Semiconductor Limited, Yokohama (JP)

( * ) Notice: Subject to any disclaimer, the term of this patent is extended or adjusted under 35 U.S.C. 154(b) by 547 days.

(21) Appl. No.: 12/071,586

(22) Filed: Feb. 22, 2008

(65) Prior Publication Data
US 2008/0209189 A1 Aug. 28, 2008

(30) Foreign Application Priority Data
Feb. 22, 2007 (JP) ............... 2007-042343

(51) Int. Cl.
G06F 9/30 (2006.01)
G06F 9/40 (2006.01)
G06F 15/00 (2006.01)

(52) U.S. Cl. .................... 712/213; 712/239
(58) Field of Classification Search .................. 712/213
See application file for complete search history.

(56) References Cited

U.S. PATENT DOCUMENTS 5,828,895 A * 10/1998 Chan et al. ............... 712/23
5,928,358 A 7/1999 Takayama et al.
6,457,117 B1 * 9/2002 Witt ............................ 712/213

FOREIGN PATENT DOCUMENTS

JP 63-75934 4/1988
JP 10-228377 8/1998

\* cited by examiner

*Primary Examiner*—Eddie P Chan
*Assistant Examiner*—Corey Faherty
(74) *Attorney, Agent, or Firm*—Staas & Halsey LLP

(57) ABSTRACT

The present invention provides an information processing apparatus having a predecoder decoding an operation code in an input instruction, generating conditional branch instruction information indicating that the input instruction is a conditional branch instruction and instruction type information indicating a type of the conditional branch instruction when the input instruction is a conditional branch instruction, and writing the input instruction, from which the operation code is deleted, the conditional branch instruction information and the instruction type information to the instruction cache memory, and a history information writing unit writing history information indicating whether or not the conditional branch instruction was branched, as a result of executing the conditional branch instruction stored in the instruction cache memory, to an area in the instruction cache memory, where the operation code of the conditional branch instruction is deleted.

18 Claims, 10 Drawing Sheets

F I G. 3
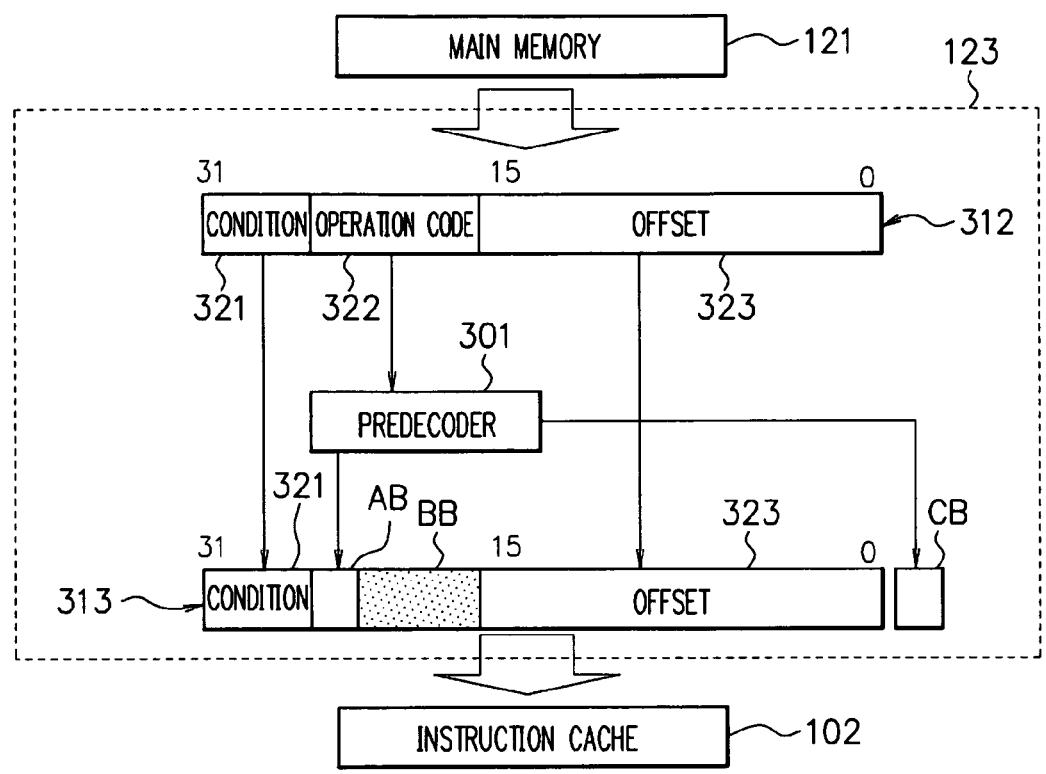

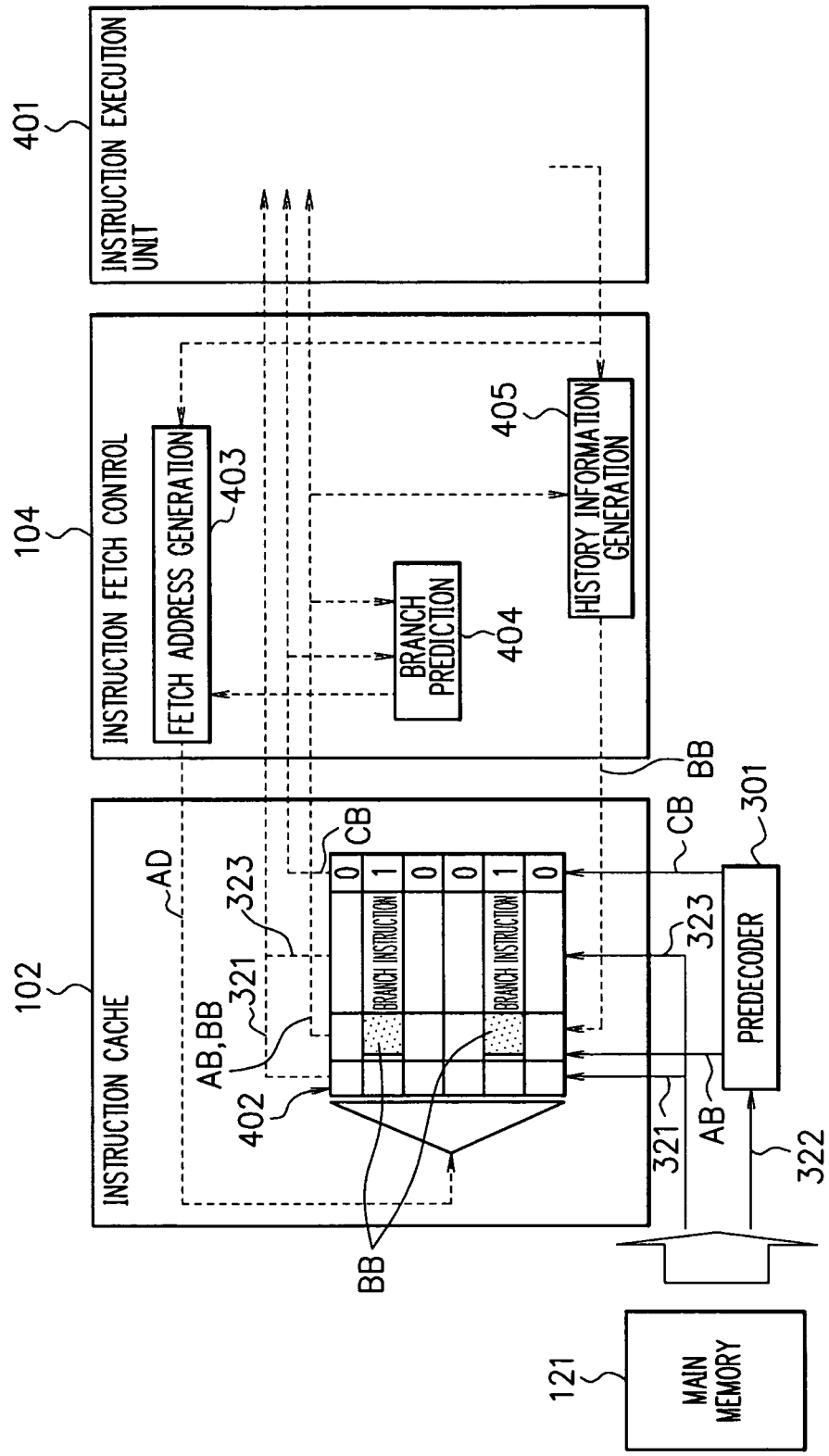
F I G. 4

F I G. 8
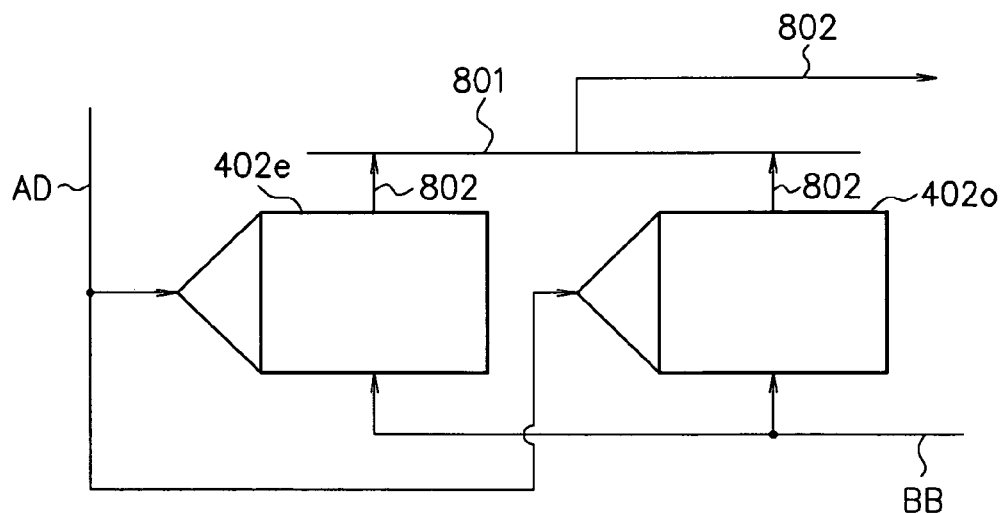
F I G. 9
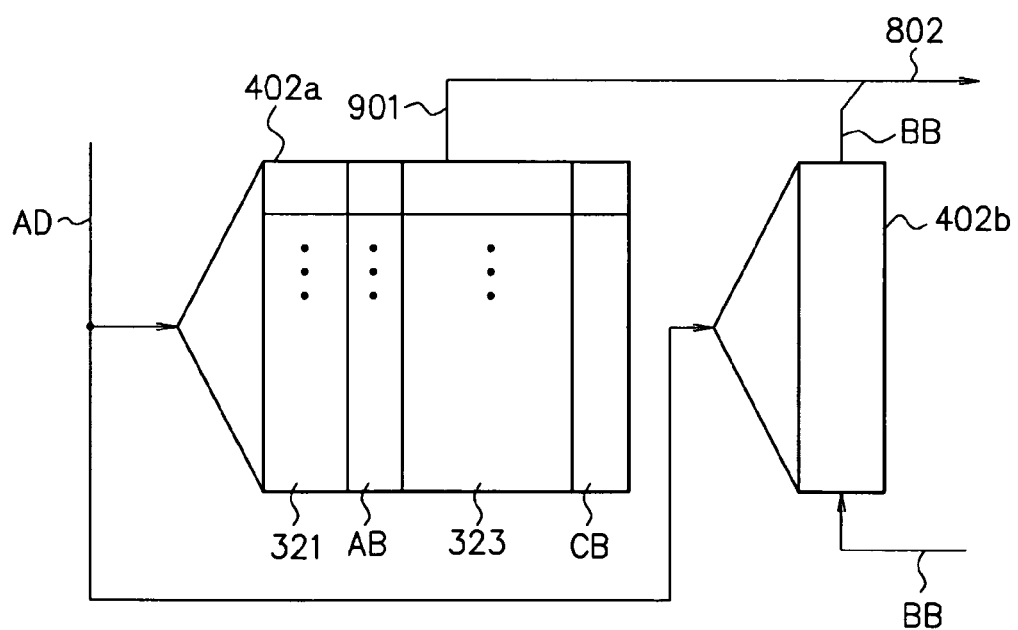

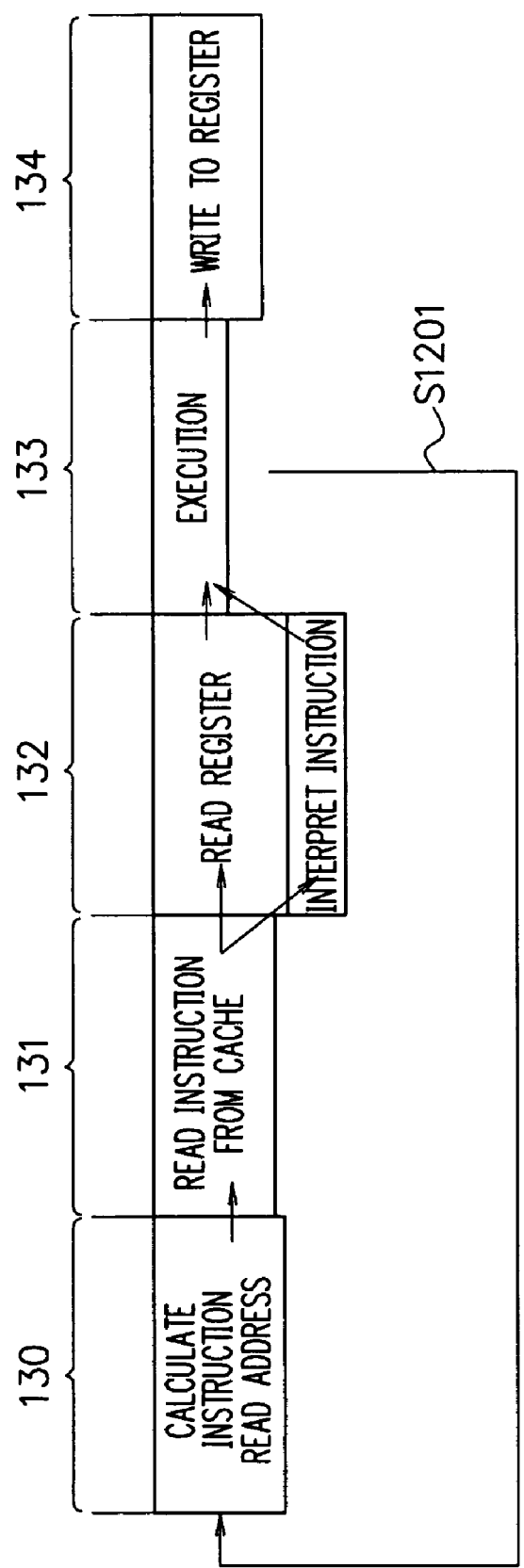

PROCESSING APPARATUS FOR STORING BRANCH HISTORY INFORMATION IN PREDECODE INSTRUCTION CACHE

CROSS-REFERENCE TO RELATED APPLICATIONS

This application is based upon and claims the benefit of priority from the prior Japanese Patent Application No. 2007-042343, filed on Feb. 22, 2007, the entire contents of which are incorporated herein by reference.

BACKGROUND OF THE INVENTION

1. Field of the Invention

The present invention relates to an information processing apparatus, particularly to an information processing apparatus for processing a conditional branch instruction.

2. Description of the Related Art

FIG. 10 is a diagram showing an instruction group 1101, which includes a conditional branch instruction. An Add instruction in the first line represents GR3=GR1+GR2. In other words, the Add instruction is an instruction to add values of the registers GR1 and GR2 and store the added value to the register GR3.

A Subcc instruction (subtract instruction) in the second line represents GR4=GR3−0×8 (hexadecimal digit). In other words, the Subcc instruction is an instruction to subtract 0×8 (hexadecimal digit) from the value of the register GR3 and store the subtracted value to the register GR4. In this case, a zero flag becomes "1" when the calculation result is "0" and becomes "0" in other cases.

A BEQ instruction (conditional branch instruction) in the third line is an instruction to branch to an address whose label name is Target 0 when the zero flag is "1," and proceed a subsequent address without branching when the zero flag is "0." In other words, it branches to the And instruction in the sixth line when the zero flag is "1," and it proceeds to the And instruction in the fourth line when the zero flag is "1."

An And instruction (logical AND instruction) in the fourth line represents GR10=GR8 & GR4. In other words, the And instruction is an instruction to calculate a logical AND of the registers GR8 and GR4 and store the calculated value to the register GR10.

An St instruction (store instruction) in the fifth line represents memory (GR6+GR7)=GR10. In other words, the St instruction is an instruction to store a value of register GR10 to a memory having an address, which is a value calculated by adding values of the registers GR6 and GR7.

In the address whose label name is Target 0, the And instruction in the sixth line is stored. The And instruction in the sixth line represents GR11=GR4 & GR9. In other words, the And instruction is an instruction to calculate a logical AND of the registers GR4 and GR9 and store the calculated value to the register GR11.

An Ld instruction (load instruction) in the seventh line represents GR10=memory (GR6+GR7). In other words, the Ld instruction is an instruction to load (read) a value from a memory having an address, which is a value calculated by adding values of the registers GR6 and GR7 and store the value to the register GR10.

Here, at the BEQ instruction (conditional branch instruction) in the third line, it is determined whether or not to branch according to the value of the zero flag. Accordingly, after executing the BEQ instruction (conditional branch instruction), a period in which any instruction is not executed (branch penalty) occurs. Generally, a branch penalty is 3 to 5 clock cycle and sometimes longer than 10 clock cycle. A branch penalty reduces execution speed of the instruction group 1101.

FIG. 11 is a diagram showing a pipeline processing of an instruction. Hereinafter, how a branch penalty occurs will be described. The stages 130 to 134 represent pipeline stages. In the first stage 130, an address to read an instruction is calculated. In the second stage 131, the instruction is read from an instruction cache memory. In the third stage 132, a value is read from a register and the instruction is decoded. In the fourth stage 133, the instruction is executed by an arithmetic unit. In the fifth stage 134, the execution result is written in the register.

In case of the instruction group 1101 shown in FIG. 10, it is determined whether or not to branch according to the result of the execution stage 133 by the BEQ instruction (conditional branch instruction). When branching, by step S1201, the process goes back to the first stage 130 to calculate an address of a branch destination having a label name of Target 0. Then, the stages 131 to 133 are performed. Accordingly, a branch penalty occurs between the execution stage 133 for the BEQ instruction (conditional branch instruction) and the execution stage 133 for the And instruction of the branch destination.

As described above, a current microprocessor is pipelined. A pipelined system is a method for a parallel processing of instructions when the stages 130 to 134 are independent. However, regarding the conditional branch instructions, the stages depend on each other and the execution stage 133 and the instruction read address calculation stage 130 are related to each other. Accordingly, a period in which any instruction is not executed occurs after the execution stage 133. This is how a branch penalty occurs.

Regarding the information processing apparatus such as a microprocessor composed of a pipeline system, a branch prediction is known as one of the methods for reducing pipeline distortion generated when a flow of control is branched by executing a conditional branch instruction. To perform a branch prediction with a high degree of accuracy, it is required to predict a success or a failure in branching for every conditional branch instructions. Accordingly, as such a method, it is considered to provide a branch prediction table storing branch prediction information corresponding to conditional branch instructions in a program. However, providing such a branch prediction table in the information processing apparatus requires a larger hardware capacity.

Patent Document 1, listed below, proposes a method for providing branch prediction information and branch history information within a branch instruction itself. According to this method, however, there is a problem that the number of bits applicable for an offset address to determine a branch destination address is reduced.

Further, Patent Document 2, listed below, discloses an information processing apparatus having storing means storing plural branch instructions including branch prediction information specifying a branch direction, prefetch means prefetching an instruction to be subsequently executed from the storing means according to the branch prediction information, and update means updating branch prediction information of the branch instruction according to an execution result of the branch instruction.

[Patent Document 1] Japanese Patent Application Laid-Open No. 10-228377

[Patent Document 2] Japanese Patent Application Laid-Open No. 63-75934

There has been a problem that, when providing a branch prediction table including branch prediction information corresponding to conditional branch instructions in a program is provided in a information processing apparatus, a branch prediction table RAM is required and the area of its semiconductor chip increases. Further, when branch prediction information is stored within a branch instruction itself, the number of bits applicable to a branch destination address has to be reduced.

SUMMARY OF THE INVENTION

According to an aspect of an embodiment, an information processing apparatus having an instruction cache memory storing an instruction, a predecoder decoding an operation code in an input instruction, generating conditional branch instruction information indicating that the input instruction is a conditional branch instruction and instruction type information indicating a type of the conditional branch instruction when the input instruction is a conditional branch instruction, and writing the input instruction, from which the operation code is deleted, the conditional branch instruction information and the instruction type information to the instruction cache memory, and a history information writing unit writing history information indicating whether or not the conditional branch instruction was branched, as a result of executing the conditional branch instruction stored in the instruction cache memory, to an area in the instruction cache memory, where the operation code of the conditional branch instruction is deleted.

BRIEF DESCRIPTION OF THE DRAWINGS

FIG. 3 is a diagram showing a configuration of a conversion circuit;

FIG. 4 is a diagram showing a processing procedure of the information processing apparatus according to the first embodiment;

FIG. 8 is a diagram showing a configuration of an information processing apparatus according to a second embodiment of the present invention;

FIG. 9 is a diagram showing a configuration of an information processing apparatus according to a third embodiment of the present invention;

FIG. 11 is a diagram showing a pipeline processing of an instruction.

DETAILED DESCRIPTION OF THE PREFERRED EMBODIMENTS

First Embodiment

Figure 1:
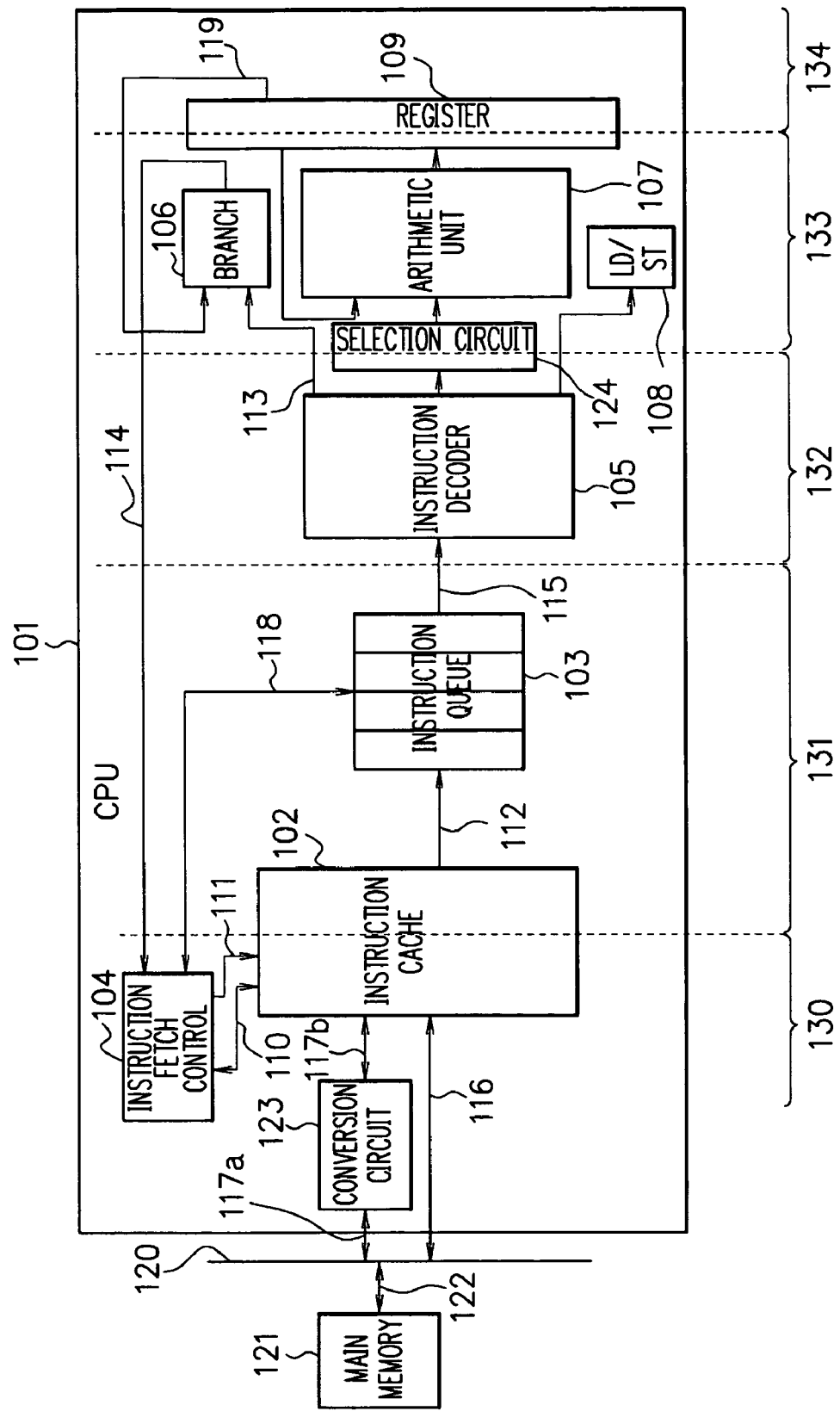
FIG. 1 is a diagram showing a configuration of an information processing apparatus according to a first embodiment of the present invention.

FIG. 1 is a diagram showing a configuration of an information processing apparatus according to a first embodiment of the present invention. The information processing apparatus performs a pipeline processing including five stages: a first stage 130, a second stage 131, a third stage 132, a fourth stage 133 and a fifth stage 134.

Figure 2:
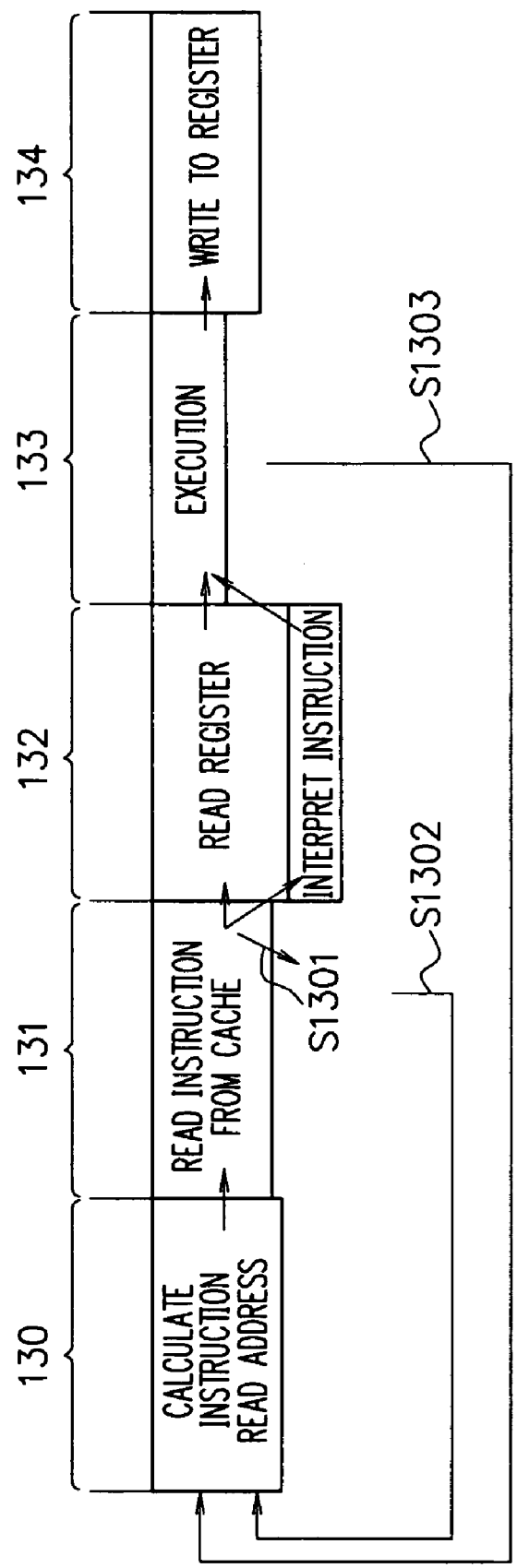
FIG. 2 is a diagram showing a pipeline processing according to the first embodiment.

FIG. 2 is a diagram showing the pipeline processing according to the present embodiment. The stages 130 to 134 are pipeline stages. In the first stage 130, an instruction fetch controller 104 calculates an address for reading an instruction. In the second stage 131, the instruction fetch controller 104 reads the instruction from an instruction cache memory 102 and transfers the instruction to an instruction queue 103. In the third stage 132, an instruction decoder 105 reads a value from a register 109 to output to an arithmetic unit 107 and decodes the instruction. In the fourth stage 133, the arithmetic unit 107 executes the instruction. In the fifth stage 134, a result of the exaction by the arithmetic unit 107 is written in the register 109.

Hereinafter, the first embodiment will be described in detail. A CPU (central processing unit) 101 is a microprocessor and connected to a main memory 121 via a bus 120. The main memory 121 is, for example, an SDRAM and connected to an external bus 120 via a bus 122. The CPU 101 includes an instruction cache memory 102, an instruction queue (prefetch buffer) 103, an instruction fetch controller 104, an instruction decoder 105, a branch unit 106, an arithmetic unit 107, a loading and storing unit 108, a register 109, a conversion circuit 123 and a selection circuit 124.

The conversion circuit 123 is connected to the external bus 120 via a bus 117a and to the instruction cache memory 102 via a bus 117b. The instruction queue 103 is connected to the instruction cache memory 102 via an instruction bus 112. The instruction cache memory 102 previously reads and stores a part of frequently used instructions (programs) from the main memory 121 and deletes instructions in order of least frequently usage. When an instruction requested by the CPU 101 is stored in the instruction cache memory 102, this case is referred to as a cache hit. In case of a cache hit, the CPU 101 receives the instruction from the instruction cache memory 102. On the other hand, when an instruction requested by the CPU 101 is not stored in the instruction cache memory 102, this case is referred to as a cache miss. In case of a cache miss, the instruction cache memory 102 sends a bus access signal 116 and requests the main memory 121 to read the instruction. The CPU 101 can read the instruction from the main memory 121 via the instruction cache memory 102. The transfer rate of the bus 112 is much faster than the transfer rate of the external bus 120. Accordingly, in case of a cache hit, its instruction reading speed is much faster than that in the case of a cache miss. Further, since the cache hit rate becomes high when the instruction (program) is sequentially read, the instruction reading speed of the CPU 101 is improved in total by providing the instruction cache memory 102.

The conversion circuit 123 is connected between the main memory 121 and the instruction cache memory and has a write circuit, which converts the conditional branch instruction and writes the converted conditional branch instruction to the instruction cache memory 102 when the instruction read from the main memory 121 is a conditional branch instruction. The details are described with reference to FIG. 3.

The instruction queue 103 is able to store plural instructions and is connected to the instruction cache memory 102 via the bus 112 and to the instruction decoder 105 via a bus 115. That is, the instruction queue 103 writes the instruction from the instruction cache memory 102 and reads the instruction to output to the instruction decoder 105. The instruction fetch controller 104 outputs a cache access control signal 110 to the instruction cache memory 102 to control inputs and outputs of the instruction queue 103. The instruction decoder 105 decodes instructions stored in the instruction queue 103.

The arithmetic unit 107 is able to execute plural instructions simultaneously. When there are simultaneously-executable instructions among the instructions decoded by the instruction decoder 105, the selection circuit 124 selects instructions to be executed at once and outputs the instructions to the arithmetic unit 107. Here, the selection circuit 124 can be omitted. The arithmetic unit 107 inputs a value from the register 109 and executes instructions decoded by the instruction decoder 105, by the single instruction or a set of simultaneously-executable instructions. The results of the executions by the arithmetic unit 107 are written in the register 109. When the instruction decoded by the instruction decoder 105 is a loading or storing instruction, the loading and storing unit 108 loads or stores between the register 109 and the main memory 121.

The arithmetic unit 107 calculates to execute the instruction of the latest conditional branch instruction and the execution result is written in the register 109. The execution result 119 in the register 109 is input to the branch unit 106. The arithmetic unit 107 calculates to execute conditional branch instruction and information indicating that a branch condition is established is input to the branch unit 106 using a flag provided, for example in the register 109. When the instruction decoded by the instruction decoder 105 is a conditional branch instruction, the instruction decoder 105 outputs a conditional branch instruction decode notice signal 113 to the branch unit 106. The branch unit 106 outputs a conditional branch instruction execution notice signal 114 to the instruction fetch controller 104 in response to the conditional branch instruction decode notice signal 113 and the conditional branch instruction execution result 119. In other words, the branch unit 106 notifies whether or not to branch in use of the conditional branch instruction execution notice signal 114 according to the execution result of the conditional branch instruction. The instruction fetch controller 104 writes the conditional branch instruction execution notice signal 114 to the instruction cache memory 102 as a latest branch history information. The branch history information is information indicating whether or not the conditional branch instruction was branched.

Next, when the instruction read from the instruction cache memory 102 is a conditional branch instruction, the instruction fetch controller 104 predicts whether or not the instruction will be branched based on the past branch history information in the instruction cache memory 102, calculates the predicted read address, and performs a prefetch request of the instruction of the read address. Concretely, the instruction fetch controller 104 performs a prefetch request by outputting the cache access control signal 110 to the instruction cache memory 102. According to the prefetch request, the instruction is prefetched from the instruction cache memory 102 to the instruction queue 103.

As described above, a prefetch request of the instruction as a conditional branch destination is performed when an instruction is read from the instruction cache memory 102 before executing the conditional branch instruction. Then, after the conditional branch instruction is executed, it is determined whether or not the instruction is to be branched. In other words, the arithmetic unit 107 calculates to execute the latest instruction of the conditional branch instruction, and the execution result is written in the register 109. The execution result 119 of the register 109 is input to the branch unit 106. The arithmetic unit 107 calculates to execute the conditional branch instruction and information indicating whether or not the branch condition is established is input to the branch unit 106 using a flag in the register 109, for example. When the instruction decoded by the instruction decoder 105 is a conditional branch instruction, the instruction decoder 105 outputs the conditional branch instruction decode notice signal 113 to the branch unit 106. The branch unit 106 outputs the conditional branch instruction execution notice signal 114 to the instruction fetch controller 104 in response to the conditional branch instruction decode notice signal 113 and the conditional branch instruction execution result. In other words, in response to the execution result of the conditional branch instruction, it is notified whether or not the instruction is to be branched in use of the conditional branch instruction execution notice signal 114. The instruction fetch controller 104 writes the above history information to the instruction cache memory 102 based on the notification. At the same time, when the branching prediction is not right, the instruction fetch controller 104 ignores the instruction of the above prefetch request and performs prefetching, decoding and exacting of the instruction of a right read address. Further, the instruction fetch controller 104 outputs an access cancel signal 111 to the instruction cache memory 102. The instruction cache memory 102 previously receives a prefetch request from the above branching destination and is being ready to access the main memory 121 in case of a cache miss. When inputting the access cancel signal 111, the instruction cache memory 102 cancels the access to the main memory 121. Accordingly, the main memory 121 is prevented from unnecessary accesses and performance deterioration can be reduced.

It has been described that the execution result 119 is input to the branch unit 106 by the register 109 to simplify the explanation; however, in actual, when a bypass circuit is used, the execution result 119 can be input to the branch unit 106 without waiting for a completion of the execution stage 133.

The instruction fetch controller 104 previously writes history information indicating whether or not the conditional branch instruction was branched, according to the calculation result, to the instruction cache memory 102. Accordingly, in the stage 131 shown in FIG. 2, the instruction fetch controller 104 reads the instruction from the instruction cache memory 102 by a process of step S1301 and, when the instruction is a conditional branch instruction, it is predicted whether or not the conditional branch instruction will be branched based on the history information. Next, in stage 130, the instruction fetch controller 104 calculates a read address according to the prediction by a process of step S1302. Then, the pipeline processing is proceeded. Then, it is determined whether or not the instruction is to be branched in the execution stage 133 for the conditional branch instruction. When the prediction is not right, the predicted instruction is canceled and the procedure goes back to stage 130 by a process of step S1303, and the instruction fetch controller 104 calculates a right read address. When the prediction is right, branch penalties are reduced.

Figure 10:
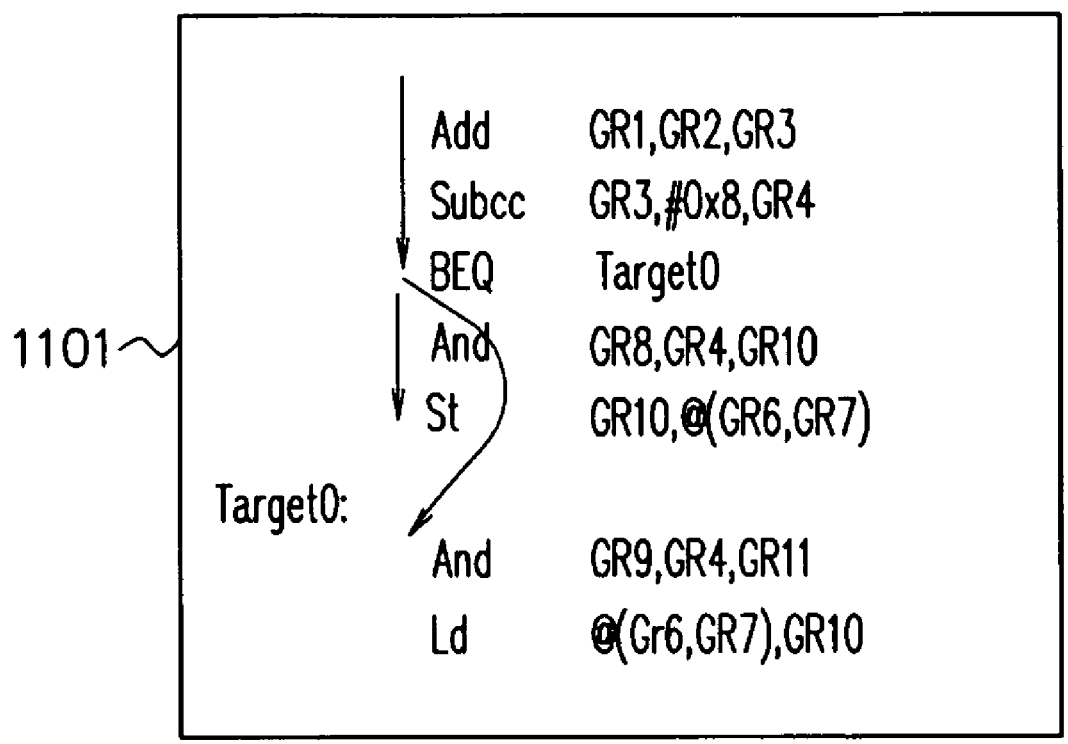
FIG. 10 is a diagram showing an instruction group including a conditional branch instruction.

FIG. 3 is a diagram showing a configuration of the conversion circuit 123 shown in FIG. 1. When the instruction 312 input from the main memory 121 is a conditional branch instruction, the conversion circuit 123 converts the conditional branch instruction 312 into a conditional branch instruction 313 and conditional branch instruction information CB and writes the conditional branch instruction 313 and the conditional branch instruction information CB to the instruction cache memory 102. The conversion circuit 123 has a predecoder 301. The conditional branch instruction is the same as that in FIG. 10.

A case, in which the conditional branch instruction 312 is input from the main memory 121 to the conversion circuit 123, will be described. A single instruction has a 32-bit (4-byte) length. The conditional branch instruction 312 includes a condition 321, an operation code 322 and an offset (program counter relative branch address) 323. The condition 321 and the operation code 322 are composed of 16 bits from 16th to 31st bits of the conditional branch instruction 312. The offset 323 is composed of 16 bits from the 0th to 15th bits of the conditional branch instruction 312. The condition 321 is a determination condition such as a zero flag or a carry flag, for determining whether to branch the instruction. The condition 321 of the BEQ instruction is a zero flag. The operation code 322 indicates a type of the instruction. The offset 323 is a program counter relative branch address, which is a relative address corresponding to a program counter value. The program counter value is a value read from the program counter in the register 109 shown in FIG. 1 and indicates a 32-bit address in the main memory 121, which is currently read and executed. When the conditional branch instruction 312 is input, the program counter value becomes the same as the address of the conditional branch instruction 312. When the conditional branch instruction 312 is branched, the instruction is branched to an address indicated by the offset (program counter relative branch address) 323.

The predecoder 301 decodes the operation code 322 of the input instruction 312 stored in the main memory 121. When the input instruction 312 is a conditional branch instruction, the predecoder 301 generates conditional branch instruction information CB, which indicates that the input instruction 312 is a conditional branch instruction, and instruction type information AB, which indicates the type of the conditional branch instruction. Then the predecoder 301 writes the instruction, from which the operation code 322 in the input instruction 312 is deleted, the conditional branch instruction information CB and the instruction type information AB to the instruction cache memory 102. Concretely, the predecoder 301 writes the instruction type information AB to an area in the instruction cache memory 102, where the operation code 322 in the conditional branch instruction is deleted. In other words, the predecoder 301 relates and writes the conditional branch instruction 313 and the conditional branch instruction information CB to the instruction cache memory 102. The conditional branch instruction information CB is 1-bit information, which indicates whether the corresponding instruction is a conditional branch instruction. For example, "1" represents that the instruction is a conditional branch instruction and "0" represents that the instruction is not a conditional branch instruction. The operation code 322 is converted by the conditional branch instruction information CB and the instruction type information AB. When the conditional branch instruction information CB, which indicates that the instruction is a conditional branch instruction, is written, most information in the operation code 322 become unnecessary and the operation code 322 is converted into instruction type information AB, which is composed of less numbers of bits. For example, the operation code 322 is composed of 10 bits and the instruction type information AB is composed of 2 or 3 bits.

Compared to the conditional branch instruction 312 before the conversion, in the converted conditional branch instruction 313, the operation code 322 is replaced with the instruction type information AB and the history information BB. In other words, the conditional branch instruction 313 includes the condition 321, instruction type information AB, history information BB and offset 323. The history information BB is initially set as information, which indicates that there is no history information, or an initial value, and, after executing the instruction, the history information BB is set as information, which indicates whether or not the corresponding conditional branch instruction 313 was branched. For example, the condition 321 is composed of 6 bits and the offset 323 is composed of 16 bits. The instruction type information AB is composed of 2 or 3 bits and the history information BB is composed of 8 or 7 bits. For example, when the history information BB is composed of 8 bits, it includes eight pieces of history information. The history information BB will be described later with reference to FIGS. 4 to 7.

The predecoder 301 decodes the operation code 322 in the input instruction 312. When the input instruction 312 is not a conditional branch instruction, the predecoder 301 writes the conditional branch instruction information CB, which indicates that the input instruction 312 is not a conditional branch instruction, and the input instruction 312 to the instruction cache memory 102.

FIGS. 4 to 7 are diagrams showing a processing procedure of the information processing apparatus according to the present embodiment. The instruction execution unit 401 includes the instruction queue 103, instruction decoder 105, selection circuit 124, arithmetic unit 107 and register 109, shown in FIG. 1, and reads an instruction in the instruction cache memory 102 to decode and execute. The instruction cache memory 102 has a cache RAM (Random Access Memory) 402. The instruction fetch controller 104 has a fetch address generator 403, a branch predictor 404 and a history information generator 405.

The fetch address generator 403 outputs a read address AD to the instruction cache memory 102. When an instruction of the address AD is not stored in the cache RAM 402, the instruction cache memory 102 outputs a read request signal to the main memory 121, as a cache miss.

Then, as shown in FIG. 4, the main memory 121 outputs an instruction 312 of the address AD to the instruction cache memory 102 via the conversion circuit 123. When the instruction 312 is a conditional branch instruction, the conditional branch instruction 312 includes a condition 321, an operation code 322 and an offset 323. The predecoder 301 decodes the operation code 322 and generates instruction type information AB and conditional branch instruction information CB. The conversion circuit 123 converts the conditional branch instruction 312 into a conditional branch instruction 313 and conditional branch instruction information CB and writes the conditional branch instruction 313 and conditional branch instruction information CB to the cache RAM 402 in the instruction cache memory 102. The conditional branch instruction 313 includes a condition 321, instruction type information AB, history information BB and an offset 323. At this point, since there is no branch history in the conditional branch instruction 313, the history information BB is set as an initial value. The instruction and the conditional branch instruction information CB are stored as being related to each other. When the instruction is a conditional branch instruction, a corresponding conditional branch instruction information CB is set as "1" and the converted instruction 313 is stored in the cache RAM 402. When the instruction is not a conditional branch instruction, a corresponding conditional branch instruction information CB is set as "0" and the instruction output from the main memory 121 is simply stored to the cache RAM 402 without being converted.

Figure 5:
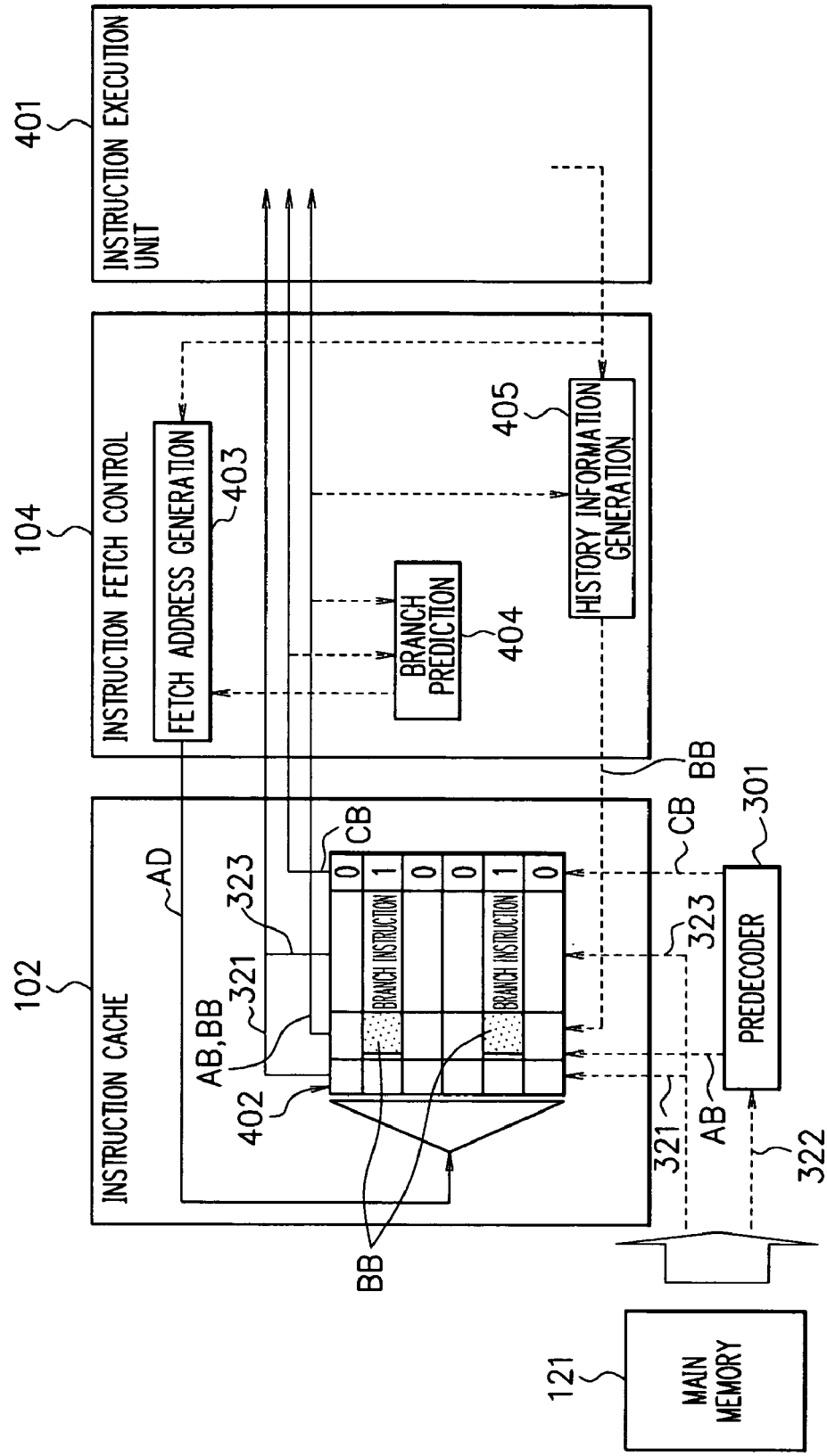
FIG. 5 is a diagram showing the processing procedure of the information processing apparatus according to the first embodiment.

As shown in FIG. 5, the instruction cache memory 102 outputs the instruction of the address AD output from the fetch address generator 403 and the conditional branch instruction information CB to the instruction fetch controller 104 and the instruction execution unit 401. Here, the procedure shown in FIG. 5 is performed when there is an instruction of the address AD in the cache RAM 402 in the case of cache hit.

Figure 6:
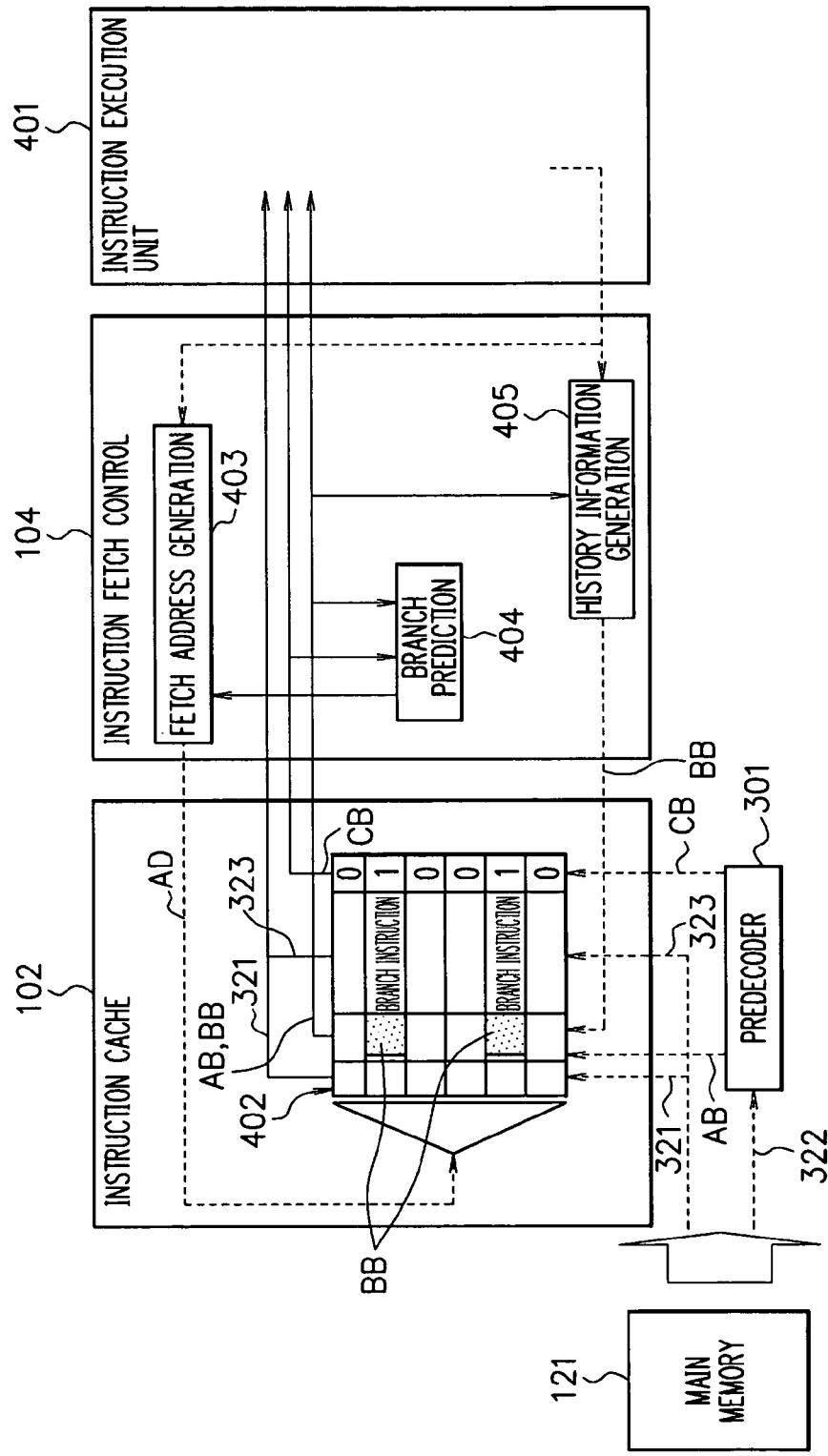
FIG. 6 is a diagram showing the processing procedure of the information processing apparatus according to the first embodiment.

As shown in FIG. 6, the branch predictor 404 determines whether or not the instruction is a conditional branch instruction based on the conditional branch instruction information CB. When the instruction is a conditional branch instruction, the branch predictor 404 predicts whether or not the conditional branch instruction is branched based on the history information BB and outputs the prediction information to the fetch address generator 403. That is, when the conditional branch instruction in the instruction cache memory 102 is read, the branch predictor 404 predicts whether or not the conditional branch instruction will be branched based on the history information BB of the conditional branch instruction and instructs the fetch address generator 403 to generate a subsequent read address based on the prediction. The history information BB is past branch history, as will be described below. For example, when the eight histories all indicate conditions, in which the instruction was branched, it can be predicted that the current conditional branch instruction will also be branched. When the eight histories indicate conditions, in which the instruction was not branched, it can be predicted that the current conditional branch instruction will not be branched. Or, when the histories indicate conditions of "branched" and "not branched" alternatively, it can be predicted that the current conditional branch instruction will follow the pattern. The history information generator 405 stores the history information BB to generate history information including the current history later. Then, as shown in step S1302 in FIG. 2, the fetch address generator 403 generates a fetch address AD based on the prediction information input from the branch predictor 404 and outputs a prefetch request to the instruction cache memory 102.

Figure 7:
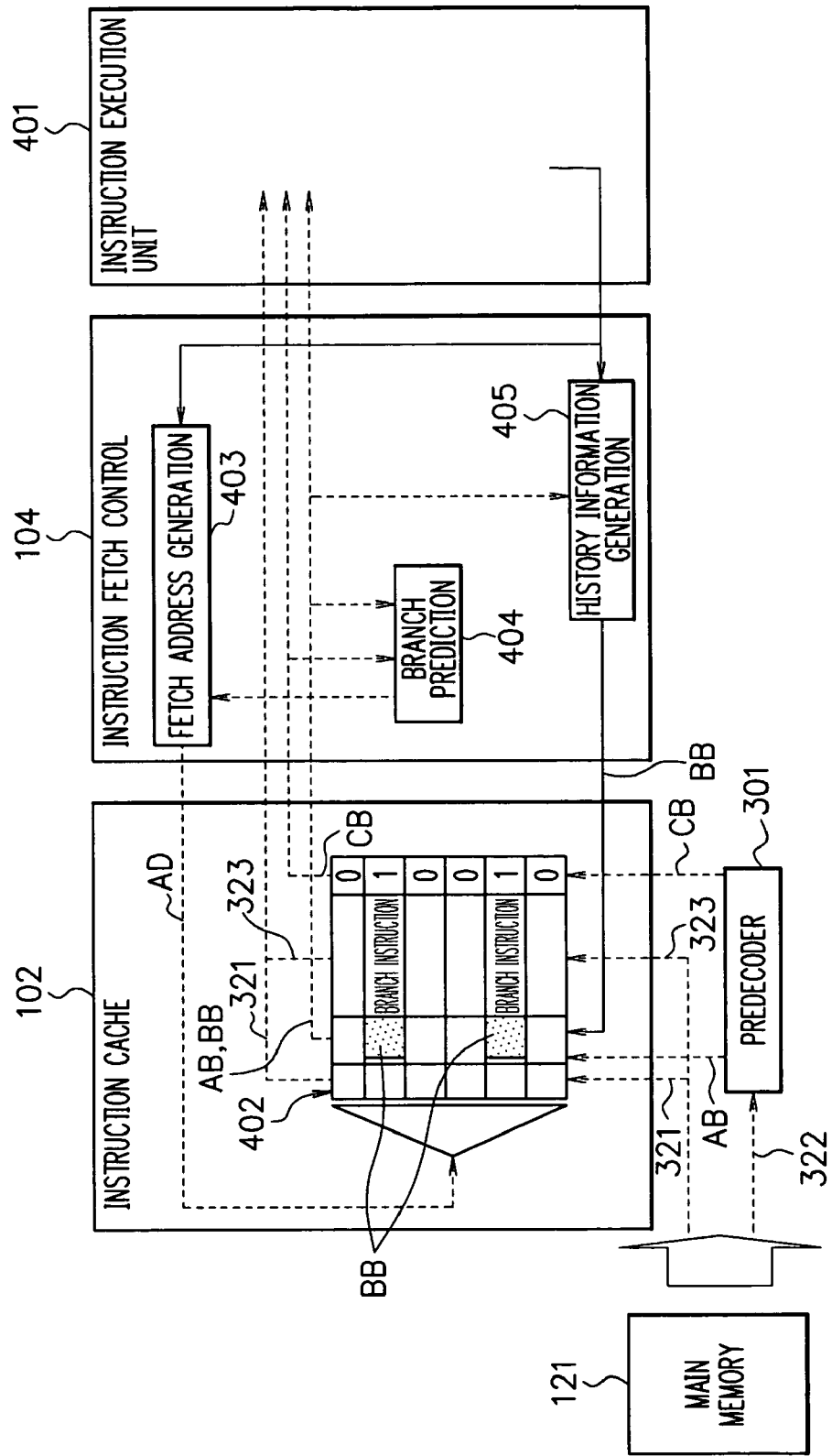
FIG. 7 is a diagram showing the processing procedure of the information processing apparatus according to the first embodiment.

As shown in FIG. 7, the instruction execution unit 401 decodes and executes the instruction input from the instruction cache memory 102. When the instruction is a conditional branch instruction, according to the execution result of the conditional branch instruction, the instruction execution unit 401 outputs history information, which indicates whether or not the conditional branch instruction was branched, to the history information generator 405 and outputs prediction result information, which indicates whether or not the above branch prediction is right, to the fetch address generator 403. When the branch prediction is not right, the fetch address generator 403 generates a correct address AD to be executed and output the address to the instruction cache memory. The history information generator 405 adds the current history information input from the instruction execution unit 401 to the past history information in the history information BB, which is input from the instruction cache memory 102, and writes the history information BB to the corresponding instruction stored in the cache RAM 402. Here, since the number of bits in the history information BB is limited, for example, the latest seven or eight histories are written in the history information BB.

As described above, the instruction execution unit 401 reads and executes the conditional branch instruction in the instruction cache memory 102 and, as a result, the history information generator (history information writing unit) 405 writes the history information BB, which indicates whether or not the conditional branch instruction was branched, to an area in the instruction cache memory 102, where the operation code of the conditional branch instruction is deleted. Concretely, the history information generator 405 writes to add the current history information to the past history information stored in the instruction cache memory 102.

Here, the branch predictor 404 can be provided in the history information generator 405. In such a structure, the instruction execution unit 401 inputs the history information, and then, next time when a conditional branch instruction corresponding to the history information is read, the history information generator 405 predicts whether the conditional branch instruction will be branched based on the history information and writes the prediction information and the history information to the instruction cache memory 102. The history information and the prediction information are written to an area where the operation code 322 in the instruction 313 is deleted. Then, when the conditional branch instruction in the instruction cache memory 102 is read, the fetch address generator 403 generates a subsequent read address indicated by the prediction information of the conditional branch instruction.

Since the cache RAM 402 in the present embodiment is a single-port RAM, when reading of an instruction and writing of history information BB conflict, only one of the processes can be performed at one time. Therefore, in order to solve this problem, an information processing apparatus according to a second embodiment and a third embodiment of the present invention will be described.

Second Embodiment

FIG. 8 is a diagram showing a configuration of an information processing apparatus according to a second embodiment of the present invention. Hereinafter, how the present embodiment differs from the first embodiment will be described. In the present embodiment, the cache RAM 402 of the first embodiment is divided into two cache RAMs 402$e$ and 402$o$. The cache RAM 402$e$ stores instructions and conditional branch instruction information CB of even addresses of the cache RAM 402, and the cache RAM 402$o$ stores instructions and conditional branch instruction information CB of odd addresses of the cache RAM 402. Accordingly, each of the cache RAMs 402$e$ and 402$o$ stores one half of the cache RAM 402. When an address of the instruction input from the main memory 121 is an even number, the conversion circuit 123 writes the instruction and conditional branch instruction information CB to the cache RAM 402$e$ and, when the address is an odd number, the conversion circuit 123 writes the instruction and conditional branch instruction information CB to the cache RAM 402$o$. When the address AD is an odd number, the cache RAM 402$e$ reads and outputs the instruction, etc. 802 of the address AD. When the address AD is an even number, the cache RAM 402$o$ reads and outputs the instruction, etc. 802 of the address AD. When the address AD is an even number, a selector 801 selects an instruction, etc. 802 output from the cache RAM 402$e$ and outputs to the instruction fetch controller 104. When the address AD is an odd number, the selector 801 selects an instruction, etc. 802 output from the cache RAM 402$o$ and outputs to the instruction fetch controller 104. The instruction, etc. 802 includes an instruction and conditional branch instruction information. When the address of the instruction corresponding to the history information BB is an even number, the history information generator 405 writes the history information BB to the cache RAM 402$e$. When the address of the instruction corresponding to the history information BB is an odd number, the history information generator 405 writes the history information BB to the cache RAM 402$o$. Here, a case, in which the cache RAM 402 includes two cache RAMs 402$e$ and 402$o$, is described; however the cache RAM 402 can be divided into three or more cache RAMs. The instruction cache memory is divided into plural instruction cache memories to write the input instructions in a distributed manner. With such a structure, while writing history information BB to the cache RAM 402e, instruction, etc. 802 can be read from the cache RAM 402o, or, while writing history information BB to the cache RAM 402o, instruction, etc. 802 can be read from the cache RAM 402e.

Third Embodiment

FIG. 9 is a diagram showing a configuration of the information processing apparatus according to a third embodiment of the present invention. Hereinafter, how the present embodiment differs from the first embodiment will be described. In the present embodiment, the cache RAM 402 of the first embodiment is divided into two cache RAMs 402a and 402b. The cache RAM 402a is a single-port RAM and stores a condition 321, instruction type information AB, an offset 323 and conditional branch instruction information CB. The cache RAM 402b is a dual-port RAM and stores history information BB. That is, the instruction cache memory includes a single-port memory 402a for storing instruction (including a condition 321 and an offset 323), from which an operation code in an input instruction is deleted, conditional branch instruction information CB and instruction type information AB, and a dual-port memory 402b for storing history information BB. The conversion circuit 123 writes an instruction 321, instruction type information AB, offset 323 and conditional branch instruction information CB to the cache RAM 402a. The history information generator 405 writes history information BB to the cache RAM 402b. When an address AD is input, according to the address AD, the cache RAM 402a reads and outputs instruction, etc. 901 and the cache RAM BB reads and outputs history information BB. The instruction, etc. 901 includes an instruction 321, instruction type information AB, offset 323 and conditional branch instruction information CB. Information 802 including the instruction, etc. 901 and the history information BB is output to the instruction fetch controller 104. Here, in view of a conflict occurrence, only reading and writing of the history information BB can conflict. Accordingly, only the history information BB is stored in the dual-port RAM 402b. With the dual-port RAM 402b, reading and writing of history information BB can be performed at the same time. Here, all of the cache RAM 402 in the first embodiment can be provided with dual-port RAMs. However, since a dual-port RAM is more expensive than a single-port RAM, the cost can be lowered according the present embodiment.

As described above, according to the first to third embodiments, the predecoder 301 decodes an operation code 322 in an input instruction. When the input instruction is a conditional branch instruction, the predecoder 301 generates conditional branch instruction information CB, which indicates that the input instruction is a conditional branch instruction, and instruction type information AB, which indicates a type of the conditional branch instruction, and writes the instruction, from which the operation code 322 in the input instruction is deleted, conditional branch instruction information CB and instruction type information AB to the instruction cache memory 102. After reading and executing the conditional branch instruction in the instruction cache memory 102, the history information generator (history information writing unit) 405 writes history information BB, which indicates whether or not the conditional branch instruction was branched, to an area in the instruction cache memory 102, where the operation code 322 of the conditional branch instruction is deleted.

Since the history information BB is written to an area, where the operation code of the conditional branch instruction is deleted, a dedicated history information table is not required and the circuit size can be reduced. Further, it is not required to reduce the number of bits applicable to a branch destination address in the conditional branch instruction. Further, the branch predictor 404 can perform a dynamical branch prediction according to the history information BB. According to the present embodiments, only when the conditional branch instruction is read from the main memory 121 to the instruction cache memory 102, the branch history information BB can be stored to the conditional branch instruction itself in the instruction cache memory 102.

It is noted that the above embodiments simply describe concrete examples of an application of the present invention and the technical scope of the present invention should not limited by the descriptions. In other words, the present invention is intended to cover a variety of embodiments, which do not constitute departures from the spirit and scope of the invention and major characteristics thereof.

What is claimed is:

1. An information processing apparatus comprising:
an instruction cache memory storing an instruction;
a predecoder decoding an operation code in an input instruction, generating conditional branch instruction information indicating that the input instruction is a conditional branch instruction and instruction type information indicating a type of the conditional branch instruction when the input instruction is a conditional branch instruction, and writing the input instruction, from which the operation code is deleted, the conditional branch instruction information and the instruction type information to the instruction cache memory; and
a history information writing unit writing history information indicating whether or not the conditional branch instruction was branched, as a result of executing the conditional branch instruction stored in the instruction cache memory, to an area in the instruction cache memory, where the operation code of the conditional branch instruction is deleted.

2. The information processing apparatus according to claim 1,
wherein the predecoder writes the instruction type information to an area in the instruction cache memory, where the operation code of the conditional branch instruction is deleted.

3. The information processing apparatus according to claim 1,
wherein the history information writing unit writes to add latest history information to prior history information stored in the instruction cache memory.

4. The information processing apparatus according to claim 1, further comprising
a branch predictor predicting whether or not the conditional branch instruction will be branched based on the history information of the conditional branch instruction when the conditional branch instruction in the instruction cache memory is read, and instructing to generate a predicted subsequent reading address.

5. The information processing apparatus according to claim 1,
wherein, when the conditional branch instruction corresponding to the history information is read again, the history information writing unit predicts whether or not the conditional branch instruction will be branched based on the history information, and writes the prediction information and the history information to the instruction cache memory.

6. The information processing apparatus according to claim 5, further comprising
an address generator generating a subsequent read address indicated by the prediction information of the conditional branch instruction when the conditional branch instruction in the instruction cache memory is read.

7. The information processing apparatus according to claim 1,
wherein the instruction cache memory is divided into two or more instruction cache memories to write the input instruction in a distributed manner.

8. The information processing apparatus according to claim 1,
wherein the instruction cache memory has a single-port memory storing the input instruction, from which the operation code is deleted, the conditional branch instruction information and the instruction type information, and a dual-port memory storing the history information.

9. The information processing apparatus according to claim 1,
wherein the predecoder decodes the operation code in the input instruction and, when the input instruction is not a conditional branch instruction, writes conditional branch instruction information indicating that the input instruction is not a conditional branch instruction and the input instruction to the instruction cache memory.

10. The information processing apparatus according to claim 1, further comprising
an instruction execution unit reading the instruction in the instruction cache memory to decode and execute, and
wherein the history information writing unit writes the history information according to a result of exaction of the conditional branch instruction by the instruction execution unit.

11. The information processing apparatus according to claim 10,
wherein the predecoder writes the instruction type information to an area in the instruction cache memory, where the operation code of the conditional branch instruction is deleted.

12. The information processing apparatus according to claim 11,
wherein the history information writing unit writes to add the latest history information to the prior history information stored in the instruction cache memory.

13. The information processing apparatus according to claim 12,
wherein the predecoder decodes the operation code in the input instruction and, when the input instruction is not a conditional branch instruction, writes conditional branch instruction information indicating that the input instruction is not a conditional branch instruction and the input instruction to the instruction cache memory.

14. The information processing apparatus according to claim 13, further comprising
a branch predictor predicting whether or not the conditional branch instruction will be branched based on the history information of the conditional branch instruction and generating a subsequent read address when the conditional branch instruction in the instruction cache memory is read.

15. The information processing apparatus according to claim 13,
wherein, when the conditional branch instruction corresponding to the history information is read again, the history information writing unit predicts whether or not the conditional branch instruction will be branched based on the history information and writes the prediction information and the history information to the instruction cache memory.

16. The information processing apparatus according to claim 15, further comprising
an address generator generating a subsequent read address indicated by the prediction information of the conditional branch instruction when the conditional branch instruction in the instruction cache memory is read.

17. The information processing apparatus according to claim 13,
wherein the instruction cache memory is divided into two or more instruction cache memories to write the input instruction in a distributed manner.

18. The information processing apparatus according to claim 13,
wherein the instruction cache memory has a single-port memory storing the input instruction, from which the operation code is deleted, the conditional branch instruction information and the instruction type information, and a dual-port memory storing the history information.

* * * * *